United States Patent Office 3,118,271
Patented Jan. 21, 1964

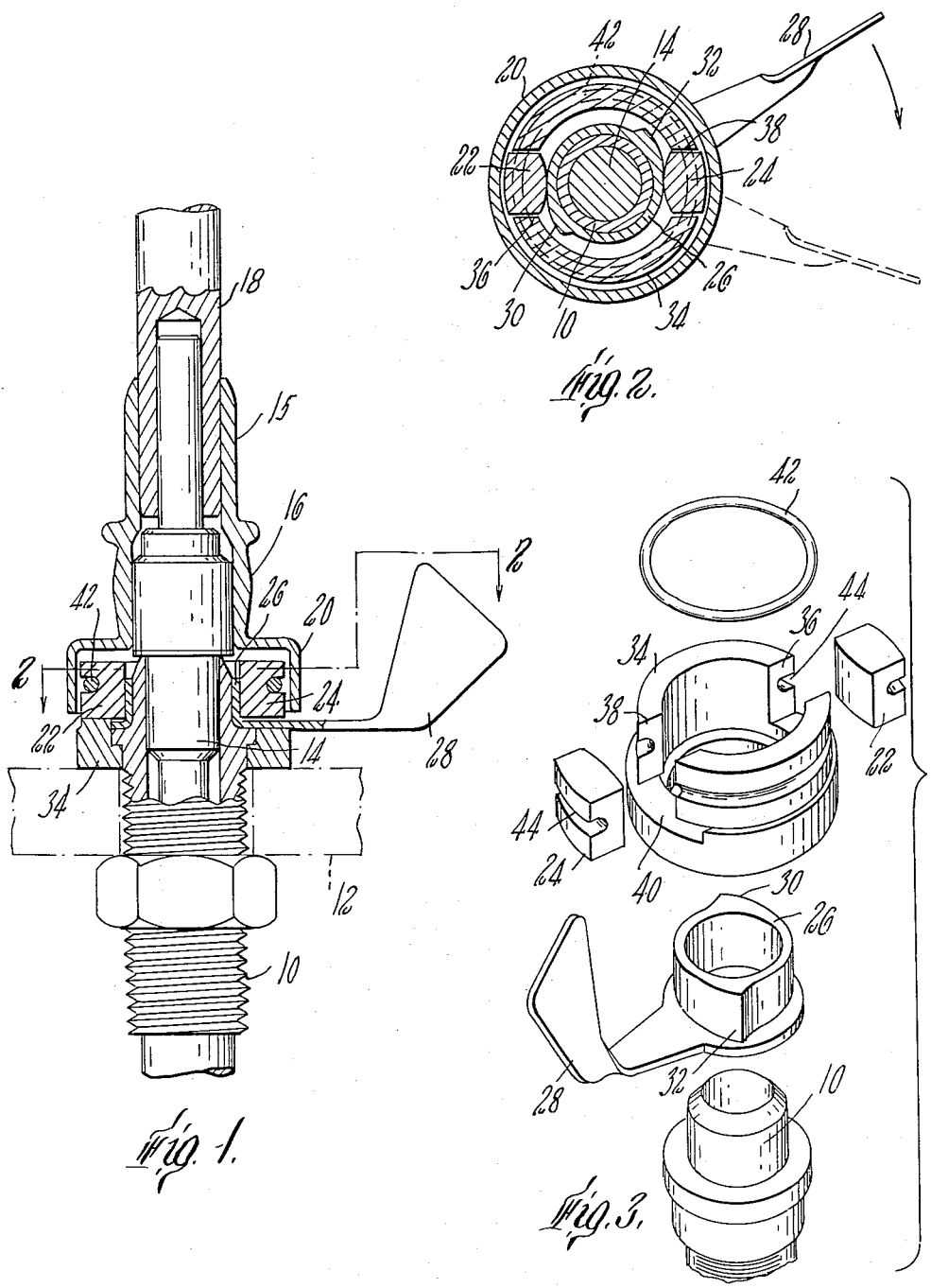

3,118,271
SPINDLE BRAKE
Ernest R. Higgs, Clemson, and Glen E. Lyons, Seneca, S.C., assignors to Saco-Lowell Shops, Boston, Mass., a corporation of Massachusetts
Filed Mar. 2, 1961, Ser. No. 92,903
3 Claims. (Cl. 57—88)

This invention relates to spindles of the type used in spinning and twister frames.

It is a principal object of the invention to provide an improved brake mechanism which operates rapidly and positively to arrest rotation of the spindle, which can be relied upon to retain the spindle in its braked position until released by the operator, and which is readily accessible for disassembly and replacement of worn out parts.

The nature of the invention will be readily understood from the following description read in connection with the accompanying drawings, and the novel features will be particularly pointed out in the claims. In the drawings:

FIG. 1 is a fragmentary view in side elevation of a spindle assembly embodying in a preferred form the several features of the invention;

FIG. 2 is a sectional plan view taken on a line 2—2 of FIG. 1, and with the brake sleeve with its controller shown in an alternative dot-and-dash line braking position; and FIG. 3 is an exploded perspective view of the spindle assembly including the parts of the brake mechanism shown specifically in FIGS. 1 and 2 of the drawings.

The construction shown in the drawings comprises a spindle base 10 mounted in the usual manner on a spindle rail 12. A stationary spindle bolster 14 is mounted in a fixed non-rotating position in the base 10. The rotary element of the spindle is a sleeve 15 having toward its lower end a whirl 16 for receiving the usual driving belt. The sleeve 15 is attached to the spindle blade 18 and the assembly runs in a conventional bolster. So far as this general organization of parts is concerned, it is substantially like those commonly used in spinning or twister frames, and as shown for example in United States Patent No. 2,533,162.

The brake mechanism which forms specifically the subject matter of the present invention comprises a skirt 20 which depends from the whirl 16 and which forms one braking element of the spindle brake. A friction braking force is applied outwardly against the internal periphery of the skirt 20 by means of two brake shoes 22, 24 which engage against diametrically opposite sides of the skirt.

The brake structure cooperating with the braking element provided by the skirt 20 comprises a sleeve cam member 26 which is rotatably mounted on the stationary base 10 and has formed thereon an outwardly projecting manual control handle 28. The sleeve cam member is disposed radially inwardly of the skirt 20 in the spindle assembly. Identical outwardly cammed brake actuating surfaces 30, 32 formed in opposite sides of the periphery of the cam sleeve act against the respective brake shoes 22, 24.

The cammed surfaces 30, 32 are contoured to provide an irreversible cam action, but with sufficient rise built in to allow for a substantial amount of wear of the associated brake shoes before replacement becomes necessary.

A further element of the present construction consists in the spindle collar 34 which is rigidly secured to the spindle base 10, and which projects upwardly within the skirt and exteriorly of said sleeve cam 26. The spindle collar 34 which is in the nature of a frame or cage, is formed at opposite sides thereof radial slots 36, 38 which provide lateral support for the brake shoes 22, 24. The spindle collar 34 is also provided with a transverse slot 40 which is located beneath the slot 38 and is adapted to receive the manual control handle 28. In the illustrated construction the brake shoes are further supported, and are biased inwardly against the cam surfaces and out of contact with the cooperating braking surface of the skirt 20 by means of a garter spring or annular elastic band 42 which is disposed in an annular groove 44 formed in the external periphery of the spindle collar and in the outer of brake surfaces of the respective brake shoes 22, 24.

The construction shown has been found to be highly efficient in operation and has the further advantage that it can be readily assembled and disassembled for the replacement of worn out parts by hand, no tools being required.

The brake shoes acting against diametrically opposite sides of the skirt 20 are arranged to have a powerful braking action, and this without any tending toward unbalancing the load on the spindle bearings. Said shoes may be made of any suitable brake material as, for example, a phenolic resin with a filler such as asbestos or cotton to improve the wearing qualities.

Replacement of the brake shoes, which are the only parts of the device subject to wear, is readily effected by lifting off the spindle sleeve 15 carrying with it the whirl 16 and skirt 20. The brake shoes 22, 24 are then replaced by hand and the process is reversed.

In the event that it should be found desirable to disassemble or to replace the member comprising the cam sleeve 26 and control handle 28, said member is readily lifted out of position over the end of the stationary spindle bolster 14, the slot 38 in the spindle collar 34 being of sufficient width to permit the throat portion of the manual control handle 28 to pass therethrough.

A preferred embodiment of the invention having been described, what is claimed is:

1. In a spindle brake mechanism having a spindle structure including a base, and a spindle sleeve including a whirl and blade rotatably mounted in said base, the combination of a spindle skirt depending from the whirl, a sleeve cam member rotatably mounted on said base within the skirt having a circular bottom flange and an upwardly extending cylindrical sleeve cam having at opposite sides of the periphery thereof outwardly cammed brake actuating surfaces, and a radially disposed manual controller for said sleeve cam formed as a lateral extension of said flange, a spindle collar secured to said base and arranged to project upwardly within the skirt and exteriorly of said cam sleeve, said spindle collar having the upper portion thereof formed with an enlarged internal diameter for external support and vertical removal of said sleeve cam member from said spindle collar, and radial brake shoe receiving slots extending through said collar at opposite sides thereof providing sliding support for said brake shoes, and an additional transverse slot to receive said controller, a pair of brake shoes mounted in said brake shoe receiving slots for engagement between said respective cammed brake actuating surfaces and the internal periphery of said skirt, and flexible means biasing said brake shoes slidably inwardly against said cammed surfaces, whereby a rotational movement of said controller and said cam sleeve therewith applies a braking frictional resistance to the rotation of said spindle skirt and spindle.

2. A spindle brake mechanism according to claim 1 in which said spindle collar and brake shoes are grooved to receive an elastic band acting to hold said brake shoes inwardly against said cam surfaces.

3. A spindle brake mechanism according to claim 1 in which the spindle sleeve including the whirl and spindle skirt are removable axially over said stationary spindle, and in which said sleeve collar is formed with an open upward extension of said transverse slot of a greater width than the portion of said manual controller projecting through said slot to permit removal of said cam sleeve member over said stationary spindle.

References Cited in the file of this patent

UNITED STATES PATENTS

| | | |
|---|---|---|
| 2,481,043 | Sacchini | Sept. 6, 1949 |
| 2,966,025 | Grundler | Dec. 27, 1960 |

FOREIGN PATENTS

| | | |
|---|---|---|
| 958,909 | Germany | Feb. 28, 1957 |